W. G. ANDERSON.
TOY.
APPLICATION FILED JULY 13, 1915.
1,236,896.
Patented Aug. 14, 1917.
3 SHEETS—SHEET 1.
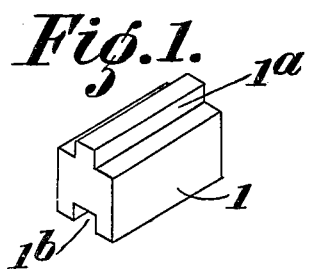
Fig.1.
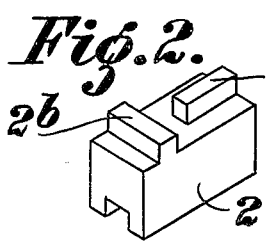
Fig.2.
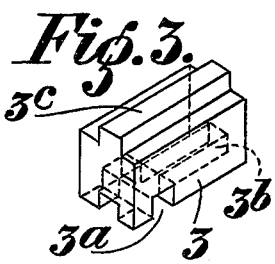
Fig.3.
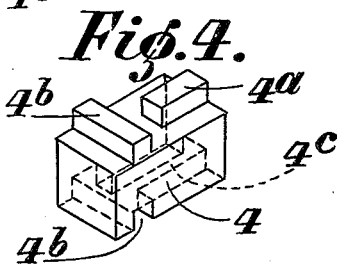
Fig.4.
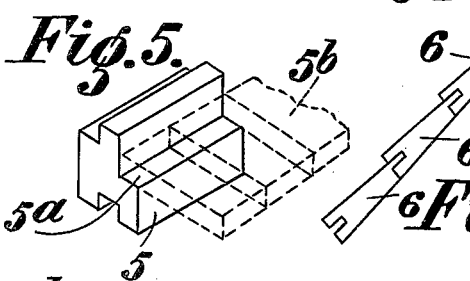
Fig.5.
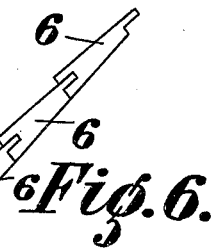
Fig.6.
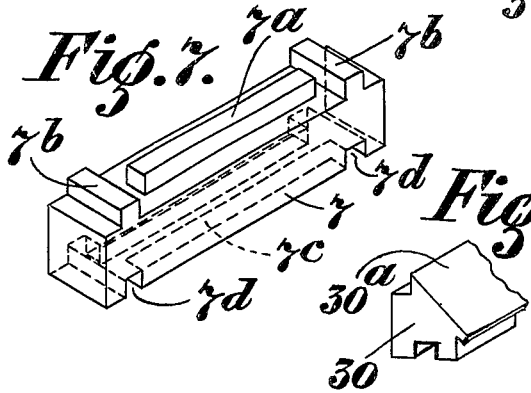
Fig.7.
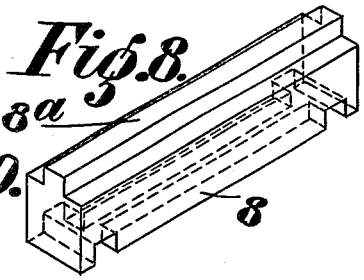
Fig.8.
Fig.30.
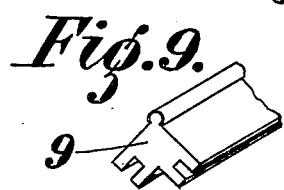
Fig.9.
Fig.10.
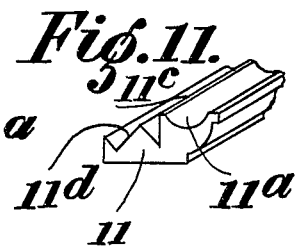
Fig.11.
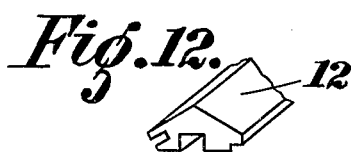
Fig.12.
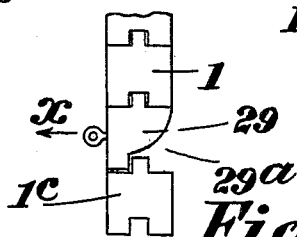
Fig.29.
Witnesses:
P. F. Nagle.
L. Houville.
Inventor.
William George Anderson.
Wiedersheim & Fairbanks.
By
Attorneys.

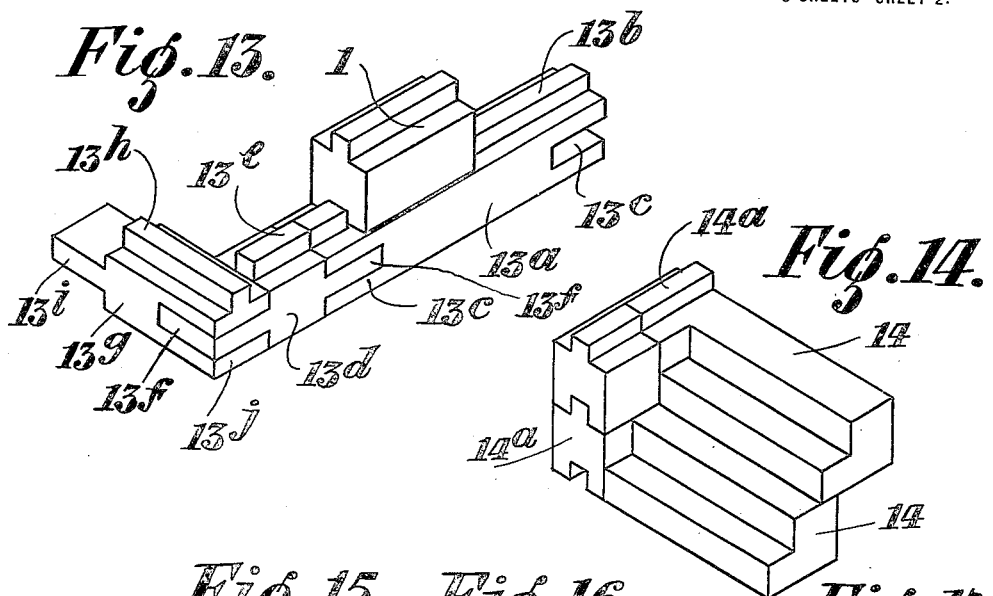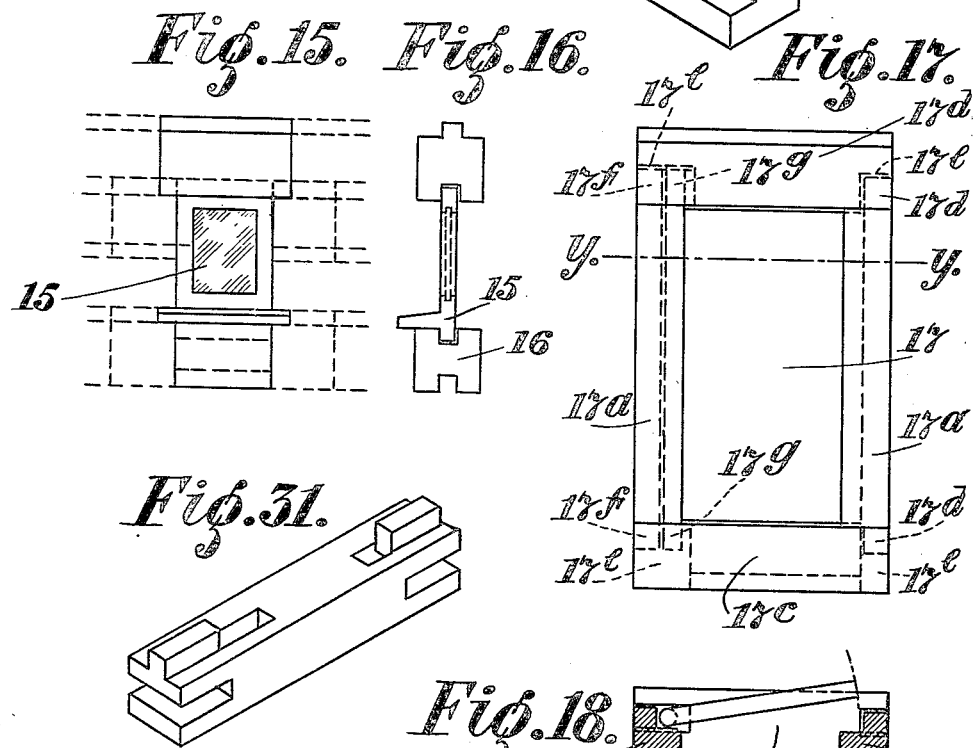

W. G. ANDERSON.
TOY.
APPLICATION FILED JULY 13, 1915.

1,236,896.

Patented Aug. 14, 1917.

Witnesses:
P. F. Nagle.
L. Douville.

Inventor:
William George Anderson,
Wiedersheim & Fairbanks,
By Attorneys:

UNITED STATES PATENT OFFICE.

WILLIAM GEORGE ANDERSON, OF BELFAST, IRELAND.

TOY.

1,236,896.  Specification of Letters Patent.  Patented Aug. 14, 1917.

Application filed July 13, 1915. Serial No. 39,619.

*To all whom it may concern:*

Be it known that WILLIAM GEORGE ANDERSON, a subject of the King of Great Britain and Ireland, residing at 1 Cliff Villas, Glenburn Park, Belfast, Ireland, has invented certain new and useful Improvements in and Relating to Toys, of which the following is a specification.

This invention relates to toys of the class in which models of houses, buildings, and the like can be built from a number of pieces, and it has for its object to provide improved model building blocks or pieces by the use of which the various parts or pieces of a model house or building or the like can be held securely together, and the house or building or the like moved, if required, without fear of the pieces coming apart.

Under my invention the pieces used for building model houses, buildings or the like of the class described are made to interlock by providing them with tongues and grooves whereby they can be engaged the one with the other, and in order to more effectively secure the parts together against horizontal displacement I provide, at intervals, binding pieces which extend in one piece right from end to end of a wall and are provided at each end with tongues or grooves, or both tongues and grooves, and adapted to engage the top pieces of the walls at right angles to the wall on which they lie. Preferably, the house or building or the like is supported on a collapsible frame suitably joined at the corners and provided with tongues and grooves on top as may be desired, the blocks or pieces being built up on said frame to form the house or building. Doors and windows can be provided where required and suitable door posts and window frames would be provided, and so made at top and bottom as to engage with the tongues and grooves of the wall pieces, the door posts being also preferably adapted to allow the doors to open and shut. When necessary, corner or other pieces having the top tongue and under groove or top groove and under tongue at right angles to each other may be provided so as to interlock and secure together adjoining outer walls and also to secure to the outer walls any internal or intersecting walls. Some of the wall pieces, may, if desired, have portions cut away to receive the flooring boards. The roof of the house, building or the like would also preferably be made up of interlocking pieces such as hereinbefore described the interlocking tiles or slates being in some cases supported on rafters and at top and bottom respectively of the roof, they engage and are supported by suitable ridge and eaves pieces. The wall and roof pieces are preferably placed in position with broken or staggered vertical joints, that is to say, the joints are not in alinement and by so arranging the pieces greater stability is secured.

In the more elaborate forms of the toys in accordance with my invention I would preferably provide stair pieces or treads which would consist of blocks each having at one end a transverse tongue and groove such that the end of the stair block so made will be capable of engaging and being supported by, and at any part of any of the walls of the house or building or the like. The other end of each stair tread is, or may be, allowed to overhang and the stairs are preferably arranged to overlap slightly one on top of the other and so afford support from top to bottom of the stair-case. Two or more of the stair treads placed at the same level could form a landing.

If desired one or more large openings may be left in the outer walls of the house or building or the like to allow of the hand being inserted for the purpose of opening or shutting doors or for other purposes, and when desired the large opening or openings could be closed by a board or equivalent with suitable markings thereon to represent bricks or stones in keeping with the rest of the outer wall, and for the purpose of presenting an entirely finished appearance to the exterior of the house or building when required. Verandas and balconies may be provided for and overhung after the manner of the stair treads hereinbefore described.

The pieces for various sizes and classes of buildings, houses, etc., would preferably be standardized and be interchangeable so that the supply of blocks, doors, windows, etc., could be added to from time to time and so allow of more and more elaborate model houses and buildings being made and also so that lost pieces could be readily replaced when required. Special pieces, such as hip roof end ridges, chimney bases and pieces, fire places, doors, windows, etc., could be sold separately as the number of these required would depend on the class of models which it is desired to build.

In order that my invention may be clearly understood I have hereunto appended explanatory sheets of drawings whereon my invention is shown by way of illustration or example.

Figures 1 to 12 show the principal pieces used in connection with my improved model building material.

Fig. 13 shows the special pieces used for the frame and on which the building is preferably erected. This view also shows how the corner pieces of the frame are made and connected.

Fig. 14 shows special stair blocks and also how they are built one on top of the other, and into the wall.

Figs. 15 and 16 show one form of special window piece and how it is arranged in the wall.

Figs. 17 and 18 show the construction of a door, in elevation and in sectional plan on line $y$, $y$ respectively, while Fig. 31 shows an alternative base piece for the door formed as part of the frame shown in Fig. 13.

Fig. 29 represents, in side elevation, certain of the blocks.

Fig. 30 represents, in perspective, one of the blocks.

On the drawings the same reference figures wherever repeated indicate the same or similar parts.

Referring to the drawings:—

Figure 19:
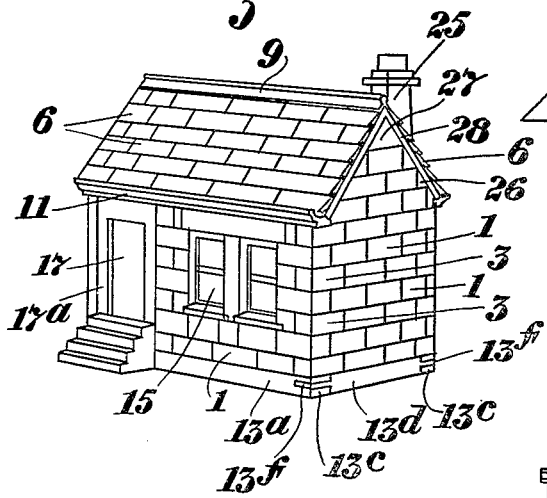
Figs. 19 to 24 show how a small model cottage can be made from the blocks shown in Figs. 1 to 18 with the addition of a chimney piece such as shown in Fig. 25 and some special beveled gable pieces such as shown in Fig. 26 and also special apex piece shown in Fig. 27 and double rafter shown in Fig. 28.
Figure 28:
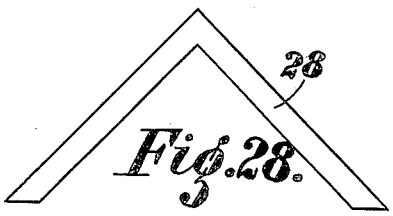
Figure 20:
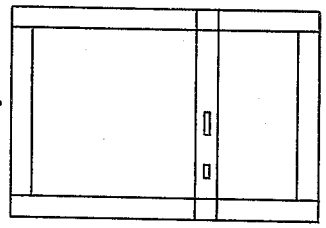
Figure 21:
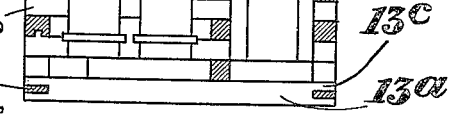
Figure 22:
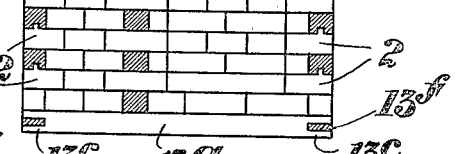

The blocks 1 are the plain wall blocks each with a tongue $1^a$ and a groove $1^b$. The wall blocks 1 are preferably built upon a frame such as shown in Fig. 13 which comprises blocks $13^a$ of suitable lengths having each a tongue $13^b$ on the top thereof and a mortise $13^c$ at each end, blocks $13^d$ with a tongue $13^e$ and tenons $13^f$ at each end and blocks $13^g$ with a tongue $13^h$ and a tenon $13^i$ at one end and a mortise $13^j$ at its other end. The tenons of the block $13^d$ engage in the mortises of the blocks $13^a$ and $13^g$ thereby forming the corner of the frame and the same construction can be repeated at the other corners. The wall is built upon this frame by using the pieces 1 and the corner pieces 3 and (or) 2. The corner piece 3 would bind the piece $13^g$ to the piece $13^d$ the binding effect being due to its groove $3^a$ engaging the tongue $13^h$ while its groove $3^b$ engages the tongue $13^e$. Another corner block or brick 3 may be used in the next course and so complete the locking effect in both directions. The alternative corner piece 2 shown in Fig. 2 is used in the same manner as piece 3 and with the same effect, the only difference being in the direction of engagement with the tongue below. A block 2 is used at the corner of a wall or elsewhere where a change of direction from the tongue $2^a$ to the tongue $2^b$ is required.

Figures 23, 26:
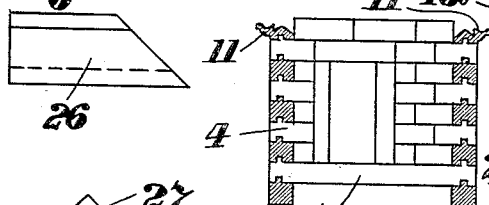
Figure 24:
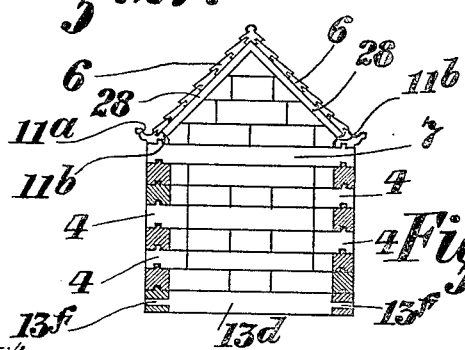

In order to effectively secure the pieces together I provide binding pieces such as 7 or 8 which extend from one wall to another parallel wall as shown in Figs. 23 and 24 and in the detail views at Figs. 7 and 8 the binding piece 7 being used where a change in direction of the tongue and groove are required from the direction of the tongue $7^a$ and the groove $7^c$ to the direction of the tongue $7^b$ and groove $7^d$; where a change in the direction of the groove only is required the binder 8 with the tongue $8^a$ extending the whole length in one direction may be used.

Doors 17 such as shown in Figs. 17 and 18 may be provided, the door posts $17^a$ being provided with tenons $17^d$ at each end to fit into mortises $17^e$ and $17^f$ in the top and bottom block $17^b$ and $17^c$, the door 17 being also provided with pivot ends $17^g$ which fit turnably in the larger mortises $17^f$ so that the door can be opened and shut. Windows 15 such as shown in Figs. 15 and 16 may also be provided, the bottom of the window being accommodated in a special double groove piece 16 the top of the window being engaged in the groove of an ordinary wall brick above.

Pieces such as 5 (Fig. 5) may be used at opposite sides of a building and provided with a portion cut away at $5^a$ to receive and support the ends of floor boards $5^b$.

The roof of the building would preferably be made up of interlocking tiles 6 (see Fig. 6) supported when necessary on double rafters 28 which at their lower ends rest on eaves pieces 11 and $11^b$ (see Fig. 11 and see also Figs. 19 and 24). The eaves pieces 11 also form a gutter $11^a$ and the groove of the bottom row of tiles preferably engages the back edge $11^c$ of the gutter $11^a$.

Figure 27:

The blocks 26 which bear at their ends against the double rafter 28 are beveled as shown at Fig. 26 while the top block or apex block 27 is beveled on both sides as shown at Fig. 27.

Figure 25:
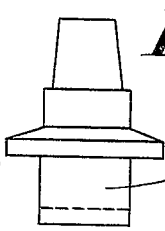

If desired a chimney piece 25 may be provided as shown at Fig. 25 and Fig. 19.

For roofs not provided with rafters an eaves block as shown in Figs. 10 and 30 may be used with the bottom tiles, preferably, engaging the edges $10^a$ or $30^a$ as the case may be. At the top of the roof I provide a ridge block such as 9 (see Fig. 9) or 12 (see Fig. 12) the block 9 being adapted for double roofs and the block 12 for single roofs.

The wall and roof pieces are preferably placed in position with staggered vertical joints as shown in Fig. 1 which helps to bind the pieces together.

In the more elaborate forms of toys in accordance with my invention I may provide internal or external stairs and Fig. 14 shows stair blocks 14 for this purpose the blocks being made in one with wall pieces 14 which build into the wall in the same manner as ordinary wall pieces and, preferably, each stair piece 14 forms two steps as shown. The stair pieces are preferably arranged to overlap and so afford support from top to bottom as shown at Fig. 14.

Internal or external intersecting walls may also be built and bound to the wall which they join by pieces 4 (see Fig. 4) which has tongues $4^a$ and $4^b$ and grooves $4^c$ and $4^d$ running at right angles to each other.

In order to permit of portions of a wall being readily removed without disturbing other parts I may provide blocks 29 as shown at Fig. 29 which are cut away at $29^a$ so that they can be drawn outward in the direction of the arrow without disturbing the block $1^c$ underneath.

Having now fully described my invention what I claim and desire to secure by Letters Patent is:—

1. For use in building toy houses and buildings, eave pieces having each a back portion brought to a narrow or sharp edge extending longitudinally of the piece and capable of entering into a corresponding groove in a bottom row of tiles forming the roof of the toy house or building and holding said bottom tiles in position so that their accidental displacement is prevented.

2. A toy house or building constructed of a plurality of building blocks provided with tongues and grooves, one of the blocks being cut away on one side so that it can be drawn outward without disturbing the other blocks of the wall thereby giving access to the interior of the building.

3. A toy house or building constructed of a plurality of building blocks provided with tongues and grooves one of the blocks being provided with a tongue on one side to engage a corresponding groove in an adjacent block and being cut away on its opposite side so that it can be drawn outward without disturbing the other blocks of the wall thereby giving access to the interior of the building.

4. For use in building toy houses and buildings, a plurality of tongue and groove building blocks, and a plurality of tenoned and mortised pieces having tongues and grooves coöperating with the tongue and groove building blocks to form the base and walls of a toy building.

In testimony whereof I affix my signature in presence of two witnesses.

WILLIAM GEORGE ANDERSON.

Witnesses:
ANDREW HAMILTON,
JOHN KNOX.